US006915538B2

(12) United States Patent
Treon

(10) Patent No.: US 6,915,538 B2
(45) Date of Patent: Jul. 12, 2005

(54) SMOOTH START SYSTEM FOR POWER CHAIR

(75) Inventor: Thomas L. Treon, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 0 days.

(21) Appl. No.: 10/684,044

(22) Filed: Oct. 10, 2003

(65) Prior Publication Data

US 2005/0077852 A1 Apr. 14, 2005

(51) Int. Cl.[7] ............................ G05B 11/01; A47C 1/14

(52) U.S. Cl. ........................... 5/611; 318/260; 318/271; 318/500

(58) Field of Search ................................ 318/256–260, 318/263–266, 268–272, 430–437, 500; 5/600, 611, 616

(56) References Cited

U.S. PATENT DOCUMENTS 3,656,478 A 4/1972 Swersey
3,896,704 A 7/1975 Barud et al.
4,101,120 A 7/1978 Seshima
4,227,131 A * 10/1980 Thiene ....................... 318/467
4,619,006 A * 10/1986 Magnoni et al. ............... 5/616
4,794,655 A 1/1989 Ooka et al.
4,907,571 A * 3/1990 Futakami ..................... 601/23
4,956,592 A 9/1990 Schulte et al.
5,163,189 A 11/1992 DeGray
5,696,686 A 12/1997 Sanka et al.
5,715,548 A 2/1998 Weismiller et al.
5,771,511 A 6/1998 Kummer et al.
5,856,736 A 1/1999 Rotunda et al.
5,990,639 A 11/1999 Arai et al.
6,000,077 A 12/1999 Cyr
6,163,903 A 12/2000 Weismiller et al.
6,316,895 B1 11/2001 Ramarathnam
6,336,235 B1 1/2002 Ruehl
6,517,775 B1 2/2003 Wang et al.
2002/0085950 A1 7/2002 Robitaille et al.

OTHER PUBLICATIONS

MIDMARK, *Installation and Operation Manual 712 Power Plastic Surgery Table.* (1995).

* cited by examiner

*Primary Examiner*—Bentsu Ro
(74) *Attorney, Agent, or Firm*—Wood, Herron & Evans, L.L.P.

(57) ABSTRACT

An apparatus, method and program product gradually and automatically accelerates or decelerates chair motor speed to achieve a smooth, nearly imperceptable movement of the chair. To this end, voltage is apportioned to the motor according to an acceleration profile.

30 Claims, 5 Drawing Sheets

SMOOTH START SYSTEM FOR POWER CHAIR

CROSS-REFERENCE TO RELATED APPLICATION

This application is related to concurrently filed U.S. Patent Applications entitled "Line Voltage Compensation System for Power Chair" and "Load Compensation System for Power Chair." The entire disclosures of these U.S. patent applications are incorporated into this application by reference.

1. Field of the Invention

The present invention relates to powered chairs and tables, and more particularly, to examination chairs and tables that may be automatically elevated, lowered or tilted.

2. Background of the Invention

Patient comfort remains an important consideration within the healthcare industry. In part for this reason, powered examination chairs have developed to comfortably support patients while a doctor or technician administers assistance. Such chairs commonly have back, foot and other support surfaces that may be automatically positioned in response to operator input. For instance, support surfaces are automatically manipulated to adjust the position of the person seated within, or to reduce the distance between a seated patient, the floor, and/or a healthcare professional. Side rails of the chair may additionally move to help a patient get into or out of the chair.

The speed at which a chair is designed to move is conventionally set at a nominal, or target speed. This target speed generally consists of a range of expected speeds, and is ideally optimized for efficient and predictable chair movement. As such, a predetermined voltage is supplied to a motor to produce a speed that generally falls within the target range. More particularly, the supplied voltage theoretically induces an amount of revolutions per minute in the motor that will cause the chair to generally move at the target speed.

As such, the predetermined voltage corresponding to the target speed is supplied to the motor in response to a command to move the chair. As a consequence, the voltage supplied to the motor instantly switches from zero to the predetermined level. That is, voltage supplied to the motor is either "on" at the predetermined voltage level, or entirely "off" at given instant. In the case where movement in initialized, this immediate supply of the predetermined voltage to the motor causes its speed to increase relatively suddenly. This sudden increase in motor speed translates into an initial jolting or jerking motion of the chair support surface, which can startle an otherwise relaxed patient. As perceived by a patient seated in the chair, this abrupt, initial motion can be a source of tenseness and apprehension.

Conversely, at the completion of the chair's travel, the voltage supplied to the motor suddenly drops from the predetermined level to zero. The abrupt halting of the moveable surface brought on by the correspondingly sudden decrease in motor revolutions can induce a similar sense of surprise and uneasiness in a patient.

As a consequence, what is needed is an improved manner of smoothly starting and stopping movement of a power chair.

SUMMARY OF THE INVENTION

The present invention provides an improved method, apparatus and program product for automatically positioning a powered chair in a manner that avoids the initial, jerky motion at then beginning and end of a chair actuation sequence. In contrast, the speed of the motor that moves a support surface of the chair is gradually ramped or otherwise accelerated to a desired speed. As such, the initial acceleration or movement of the chair may be nearly imperceptible to a seated patient.

To this end, the speed of the motor may be positively or negatively ramped on a first order exponential curve to provide for a smooth start or finish, respectively, to the chair's movement. As such, the gradual acceleration is achieved by apportioning voltage to the motor according to an exponential or gradually stepped voltage supply signal and/or reference voltage.

More particularly, a voltage supply signal comprising a reference voltage and/or a gradual increase in voltage magnitude is applied to motor control circuitry to produce the desired, gradual initial movement of the motor and support surface. In generating the voltage supply signal, an embodiment consistent with the principles of the present invention may determine the voltage applied to the motor at a given instant The determined voltage is proportional to or otherwise indicative of the speed of the motor. In accordance with one embodiment that is consistent with the principles of the present invention, the determined voltage may them be compared to a reference voltage. The reference voltage may comprise a gradually increasing range of voltages, such as may be plotted on a first order exponential curve. The duty cycle of a voltage supply signal supplied to the motor is modified according to the voltage comparison. Once a gradual, acceleration sequence is accomplished, the reference voltage may revert to and otherwise comprise the desired speed.

A controller of another embodiment may execute program code configured to ramp the voltage supply signal and/or reference voltage according to a stored acceleration profile. The controller may initiate such processes in response to user input.

Another of the same embodiment that is consistent with the principles of the present invention may additionally compensate for load forces and/or changes in line voltage when gradually accelerating the motor of the chair. An exemplary load force may include the weight of a patient, as well as other gravitational and mechanical forces associated with chair travel. As such, gradual acceleration is achieved by apportioning voltage to the motor according to the gradual increase in the reference voltage/acceleration profile, in addition to the line voltage and/or the load.

By virtue of the foregoing there is provided an improved chair positioning system that addresses shortcomings of the prior art. These and other objects and advantages of the present invention shall be made apparent in the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention.

DETAILED DESCRIPTION OF THE PREFERRED EMBODIMENTS

Figure 1:
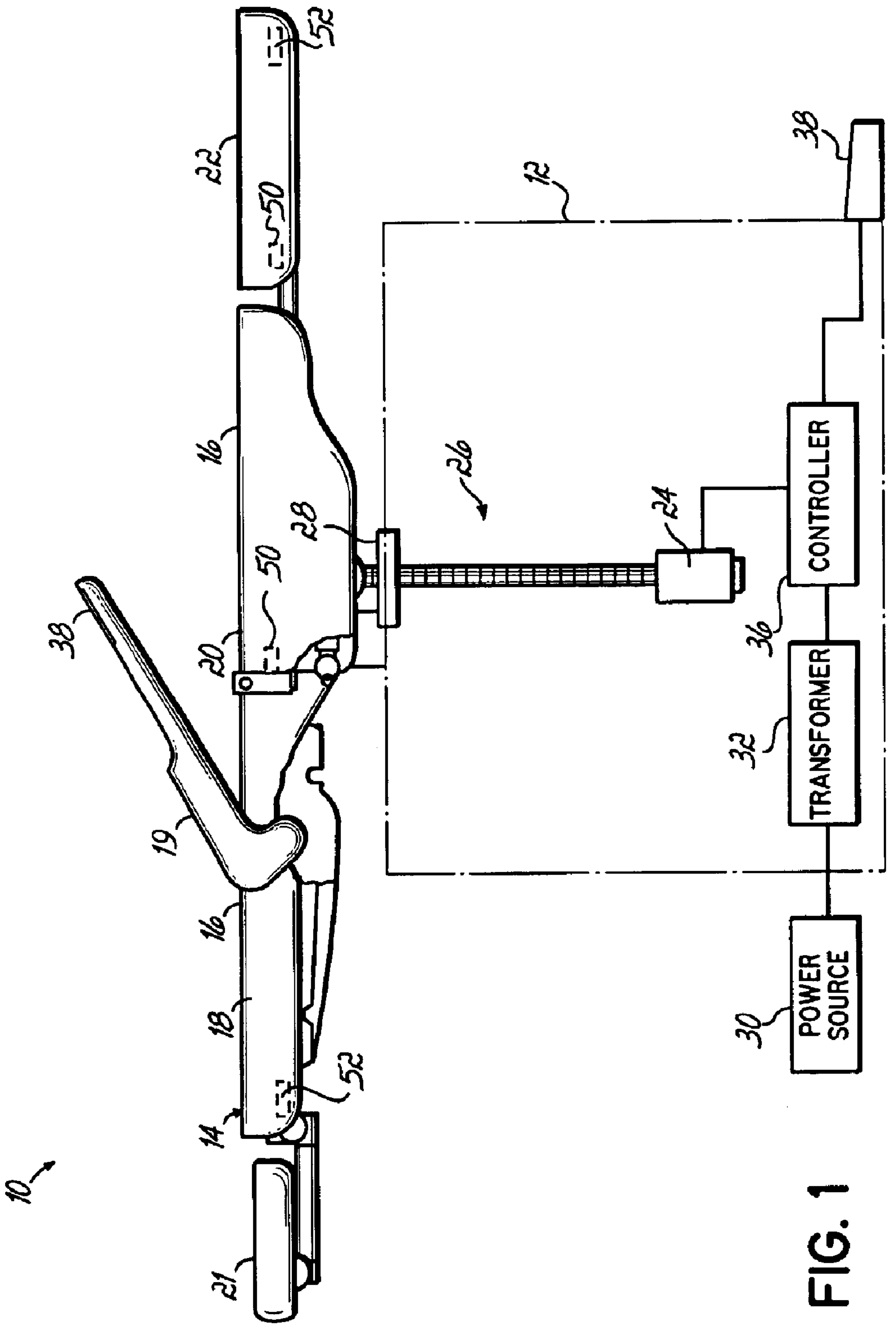
FIG. 1 shows a schematic diagram of a chair system in accordance with the principles of the present invention.

FIG. 1 shows chair system 10 that may be gradually positioned in accordance with the principles of the present invention. The chair system 10 includes a moveable column 12 to which a support surface 14 is mounted. Upholstered sections 16 are removable and mounted to the support surface 14. As shown in FIG. 1, the support surface 14 comprises a back support 18 and a head support 21 that pivotally attach to a seat support 20. The support surface 14 additionally includes a foot support 22, which also pivotally attaches to the seat support 20. The chair system 10 illustrated in FIG. 1 is equipped with powered tilt and elevation and may be positioned in a number of ways.

The block diagram of FIG. 1 shows a motor 24 configured to power an actuator 26. A motor 24 comprises a direct current (DC) motor. One skilled in the art, however, will appreciate that any manner of electric motor, including alternating current (AC) motors, may be alternatively used in accordance with the principles of the present invention.

An actuator 26 consistent with the principles of the present invention includes any device configured to initiate movement of the support surface 14. The actuator 26 may include a screw shaft and gearing for enabling the motor to rotate the screw shaft. For this purpose, a nut may be mounted on each shaft for converting the rotary motion of the shaft into linear motion of an actuator arm 28. The actuator arm 28, in turn, positions the support surface 14. While only one motor 24 and actuator 26 are shown in FIG. 1, one skilled in the art will appreciate that several such motors and/or actuators may be used to position a chair system 10 in accordance with the principles of the present invention.

A source 30 supplies voltage to a transformer 32, which powers the chair system 10 of FIG. 1. An exemplary transformer 32 steps down voltage from the power source 30 for hardware convenience and operating considerations. A suitable source 30 may include DC or AC input voltage. The power source 30 provides a line voltage to the chair system 10.

More particularly, the motor 24 of the chair system 10 receives voltage from motor control circuitry 34 of a controller 36. The motor control circuitry 34 produces a voltage supply signal having a fixed frequency, adjustable pulse width. As such, the controller 36 of the embodiment shown in FIG. 1 generates pulse width modulated (power) signals including a variable duty cycle. The power signal delivers a variable voltage to the motor 24. Using this pulse width modulated scheme, the motor speed may be gradually accelerated according to an acceleration profile. For purposes of this specification, motor "speed" may alternatively be referred to as "revolutions per minute."

The controller 36, in turn, may receive control inputs from a series of switches, pedals, cartridges, diskettes and/or sensors comprising user input devices 38. Such input may comprise a control signal in an embodiment of the present invention. Other control signal sources may include output from voltage sensing circuitry 42, which may be internal or external to the controller 36. Exemplary voltage sensing circuitry 42 comprises a device configured to determine the voltage delivered to the motor 24 or present at any other location within the chair system 10. Where desirable, input sources may further include position sensors 50 and limit switches 52 for detecting and limiting the positions and movement of the support surface 14.

Figure 2:
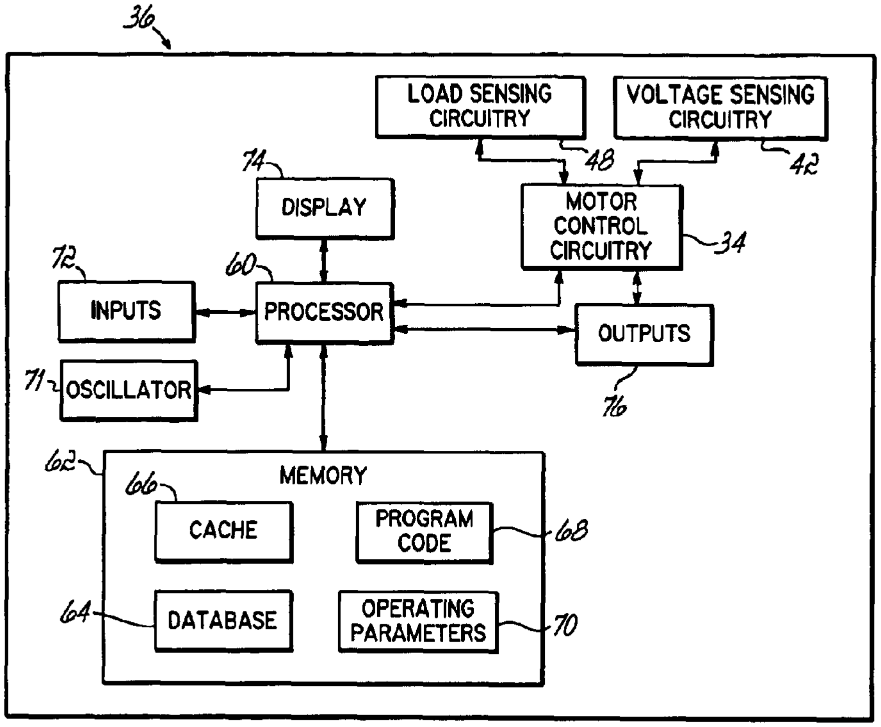
FIG. 2 shows a block diagram of the controller of FIG. 1.

FIG. 2 is a block diagram of the controller 36 of FIG. 1. As shown in FIG. 2, the controller 36 may include one or more processors 60. The controller 36 may additionally include a memory 62 accessible to the processor 60. The memory 62 may include a database 64 and/or cache memory 66. For instance, a database may contain acceleration profiles comprising a sequence of increasing or decreasing reference voltages. Another suitable acceleration profile may include instructions to initiate generation of a gradually increasing or decreasing voltage supply signal. Cache memory 66 may be used to temporarily store a sensed voltage or current, for instance.

The memory 62 may also include program code 68. Such program code 68 is used to operate the chair system 10 and is typically stored in nonvolatile memory, along with other data the system 10 routinely relies upon. Such data may also include operating parameters 70 such as predefined reference voltages, crash avoidance and program addresses. Program code 68 typically comprises one or more instructions that are resident at various times in memory 62, and that, when read and executed by the processor 60, cause the controller 36 to perform the steps necessary to execute functions or elements embodying the various aspects of the invention. For instance, the program code 68 of one embodiment may cause the reference voltage level to be gradually ramped up or down according to a predetermined acceleration profile.

The controller 36 also receives and outputs data via various input devices 72, a display 74 and an output device 76. A network connection may comprise another input device 72 that is consistent with the principles of the present invention. Exemplary input device 72 may include hand and foot pedals 38, limit switches and position sensors, as well as an oscillator 71. Still other input devices may include service and program ports. A suitable display 74 may be machine and/or user readable. Exemplary output(s) 76 may include a port and/or a network connection. As such, the controller 36 of an embodiment that is consistent with the principles of the present invention may communicate with and access remote processors and memory, along with other remote resources.

The controller 36 of FIG. 2 includes motor voltage sensing circuitry 42 that comprises a device configured to measure voltage applied to and/or the rotational speed of the motor 24. The controller 36 further includes motor load sensing circuitry 48. The motor load sensing circuitry 48 comprises a device that measures current through and/or the rotational speed of the motor 24. While the controller 36 of FIG. 2 includes voltage sensing circuitry 42 and load sensing circuitry 48, one skilled in the art will appreciate that other embodiments that are consistent with the invention may alternatively include voltage and load sensing circuitry equivalents external to the controller. Moreover, one of skill in the art will appreciate that the functionality of the voltage sensing circuitry 42 and load sensing circuitry 48, as with all functionality of the controller 36 and electrical components of the chair system 10, may alternatively be realized in an exclusively or hybrid software environment. Furthermore, a controller for purposes of this specification may include any device comprising a processor.

The processor 60 optically or otherwise interfaces with and provides instructions to the motor control circuitry 34.

The motor control circuitry 34 receives input from the motor voltage sensing circuitry 42 to determine a control signal that is directly proportional to the speed of the motor 24. The motor control circuitry 34 further compares the control signal to a stored reference voltage. If they do not match within predefined parameters, the controller 36 may generate an error signal. An error signal may comprise a control signal as discussed herein. The motor control circuitry 34 processes the error signal to determine how to modulate the pulse width (and duty cycle) of the power signal.

While embodiments that are consistent with the principles of the present invention have and hereinafter will be described in the context of fully-functioning controllers, computers, and processing systems, those skilled in the art will appreciate that various embodiments of the invention are capable of being distributed as a program product in a variety of forms, and that the invention applies equally regardless of the particular type of signal-bearing media used to actually carry out the distribution. Examples of signal bearing media include, but are not limited to recordable type media such as volatile and non-volatile memory devices, floppy and other removable disks, hard drives, magnetic tape, optical disks (e.g., CD-ROMs, DVDs, etc.), among others, and transmission type media such as digital and analog communication links.

In addition, various program code described hereinafter may be identified based upon the application within which it is implemented in the specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which programs may be organized into routines, procedures, methods, modules, objects, and the like, as well as the various manners in which program functionality may be allocated among various software layers that are resident in a typical processor (e.g., operating systems, applets, etc.), it should be appreciated that the invention is not limited to the specific organization and allocation of program functionality described herein.

Figure 3:
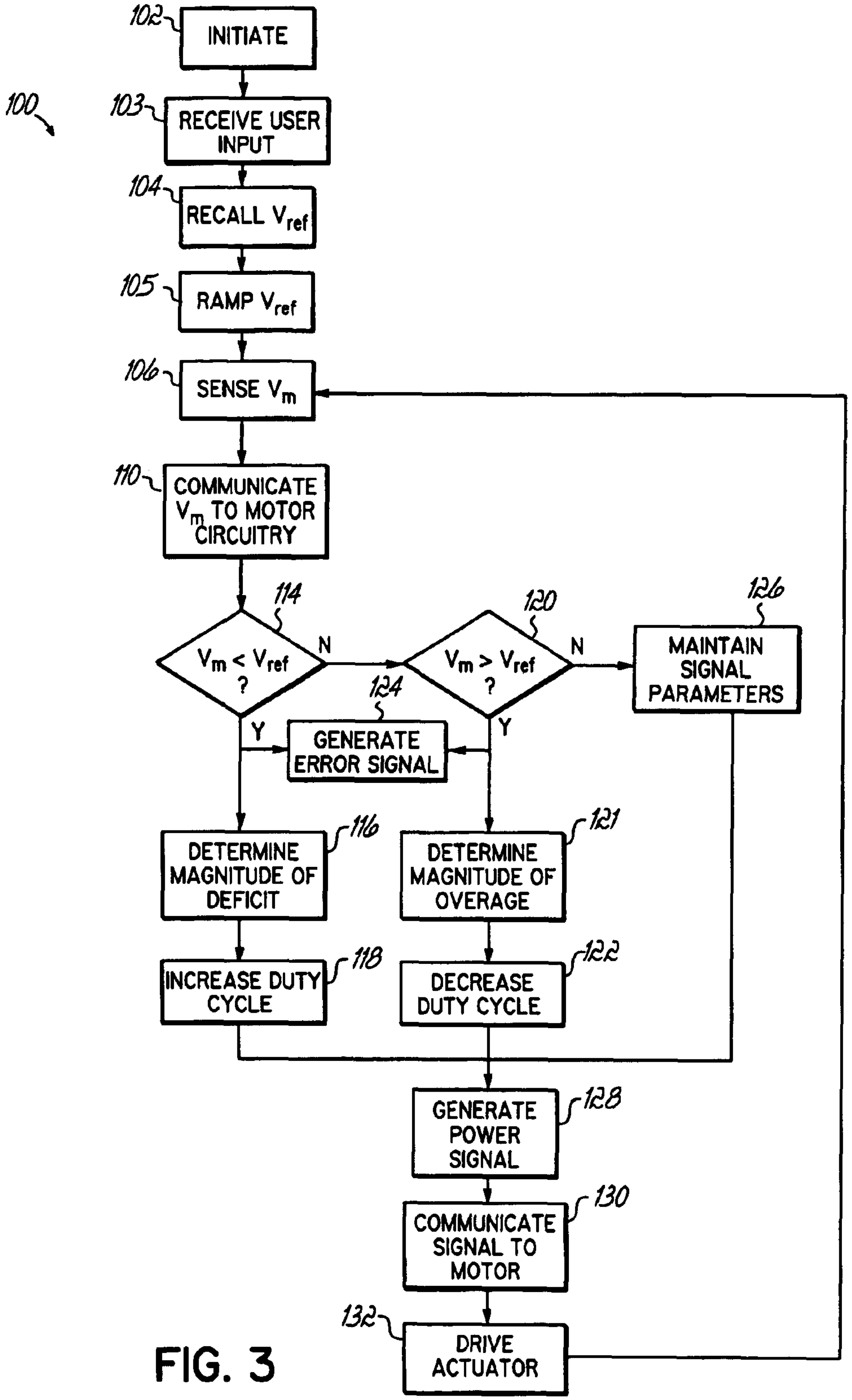
FIG. 3 is a flowchart having a sequence of steps executable by the system of FIG. 1 for automatically positioning a chair at a desired speed using a determined voltage measurement.

FIG. 3 is a flowchart 100 having a sequence of steps configured to gradually accelerate support surface 14 and/or chair motor 24. Turning more particularly to the flowchart 100, a user may initiate processes that are consistent with the present invention at block 102. Such processes may include booting relevant program code 68. Other processes performed at block 102 may include initializing applicable memory 62.

The controller 36 may receive user or automated inputs 72 at block 103 configured to initiate movement of a support surface 14. For example, the user input may initiate movement of back and foot supports 18 and 22, respectively. The input 72 may prompt the recall from memory 62 of an acceleration profile comprising one or more reference voltage levels, $V_{ref}$, at block 104.

Figure 4:
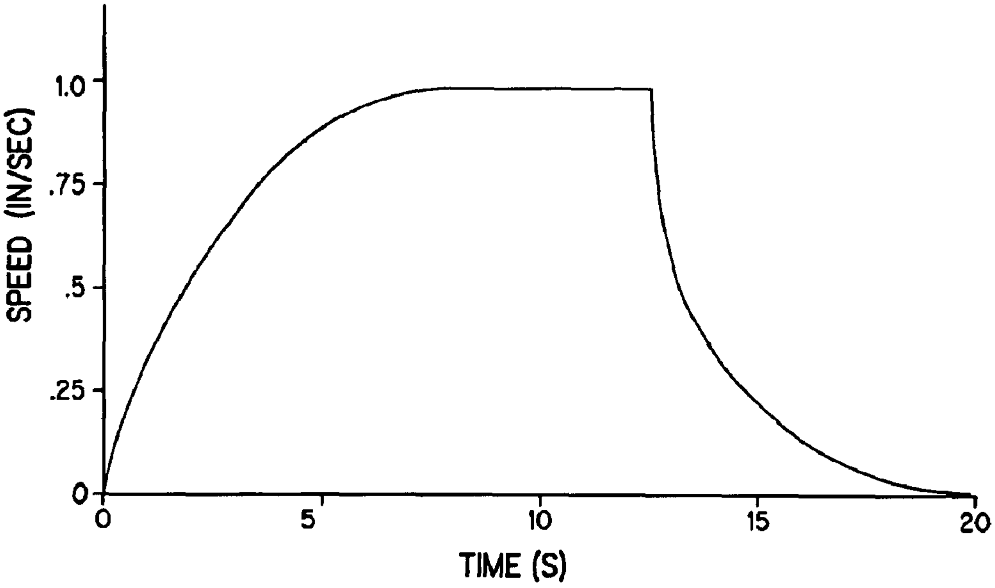
FIG. 4 is a plot of an acceleration curve in accordance with the principles of the present invention.

FIG. 4 shows a curve 33 having first order exponential portions representative of a sequence of reference voltage levels comprising an exemplary acceleration profile. The curve 33 is plotted as a function of time. As shown in FIG. 4, the curve 33 includes a gradual, positive acceleration portion 34 corresponding to an initial, subtle ramping up of the motor speed. A middle portion 35 of the curve corresponds to a period of support surface travel where the chair moves at the desired speed. A negative acceleration portion 36 of the curve 33 coincides with a gradual ramping down of voltage supplied to the motor 24. While the exponential nature of the curve 33 may have particular application within embodiments that are consistent with the present invention, one of skill in the art will appreciate that other suitable curves or stepped voltages may be alternatively used to create a gradual acceleration in accordance with the principles of the present invention.

In response to the input at block 103, the chair system 10 may begin to sequence through, or ramp to the final level of the reference voltage at block 105 according to the acceleration profile. Of note, different movable parts of a support surface may have different acceleration profiles. For instance, a foot support 22 may accelerate at a faster rate than a head support 21 for comfort considerations.

The ramped reference voltage causes a voltage supply signal to be generated according to gradually accelerated voltage levels that are proportional to the ramped reference voltage. Because the voltage supplied to the motor 24 via the voltage supply signal is roughly proportional to the revolutions per minute (rpm's) of the motor 24, the motor 24 is gradually accelerated according to the reference voltage and acceleration profile. That is, the rpm's are translatable into a distance gradually and/or incrementally traveled by a support surface 14 for some period of time preceding or subsequent to the surface's travel at the desired speed. Moreover, the reference voltage can be set at a magnitude that generally or precisely corresponds to a desired speed.

An embodiment consistent with the principles of the present invention may use a stepped-down or derivative voltage level as the reference voltage. For instance, a voltage of 48 volts delivered to the motor 24 may correspond to a reference voltage of 5 volts. This stepped-down voltage may have signal processing advantages.

At any given instant of an acceleration and/or actuation sequence, the reference voltage is used as a point of comparison for the voltage supplied to the motor 24. To this end, a voltage sensing circuitry 42 may measure at block 106 a motor voltage, $V_m$, delivered to the motor. As discussed herein, the measured motor voltage may be stepped down to accommodate circuitry specifications. The determined voltage is communicated to the motor control circuitry 34 at block 110.

As shown at block 114, the comparison of the determined motor voltage ($V_m$) to the voltage reference ($V_{ref}$) may determine if the duty cycle of a power signal delivered to the motor 24 should be modified. For example, where the applied voltage is less than the reference voltage for a given instant, the motor control circuitry 34 of the controller 36 may increase the duty cycle at block 118 according to the difference between the applied voltage and the reference voltage, as determined at block 116 of FIG. 3. Of note, this determined difference may take into account any scaling or other processing used to step down a motor voltage, as discussed in connection with block 106. Moreover, one of skill in the art will appreciate that, where so configured, the difference may alternatively be used to step up motor voltage in another embodiment that is in accordance with the principles of the present invention.

If the determined voltage at block 120 is alternatively determined to be greater than the reference voltage during cycle of the feedback loop of FIG. 3, then the duty cycle of the power signal may be decreased at block 122. Such may be the case where the reference voltage is ramping down and the support surface 14 is gradually coming to rest. The duty cycle may be decreased at block 122 in proportion to the difference between the determined voltage and the reference voltage.

If the applied voltage at block 120 is alternatively determined to be greater than the reference voltage, then the duty cycle of the power signal may be decreased at block 122. The duty cycle may be decreased at block 122 in proportion to the difference between the actual voltage and the reference voltage.

Where so configured at block 124, a control signal comprising an error signal may be initiated by motor control circuitry 34 in response to a discrepancy between the applied and reference voltages. The error signal generated at block 124 will automatically initiate modification of the duty cycle in proportion to the load at block 118 or block 122. Where the determined voltage of the control signal is alternatively equal to or otherwise within acceptable tolerances of the reference voltage, the duty cycle of the power signal is maintained, as indicated at block 126 of FIG. 3.

In any case, the motor control circuitry 34 responds to a command to increase or decrease the duty cycle of the motor 24 by generating a pulse width modulated signal as shown at block 128. The resultant voltage supply signal is then communicated to the motor 24 at block 130. In this manner, the actuator 26 is gradually accelerated at block 132 in a manner that may be nearly imperceptible to a patient.

The sequence of steps of the flowchart 100 of FIG. 3 may be accomplished automatically and in realtime. Thus, the voltage supplied to the motor 24 is continuously and automatically adjusted to achieve a smooth acceleration, whether negative or positive. Moreover, this dynamic adjustment may be accomplished in a manner that is transparent to the patient and/or healthcare professional.

Figure 5:
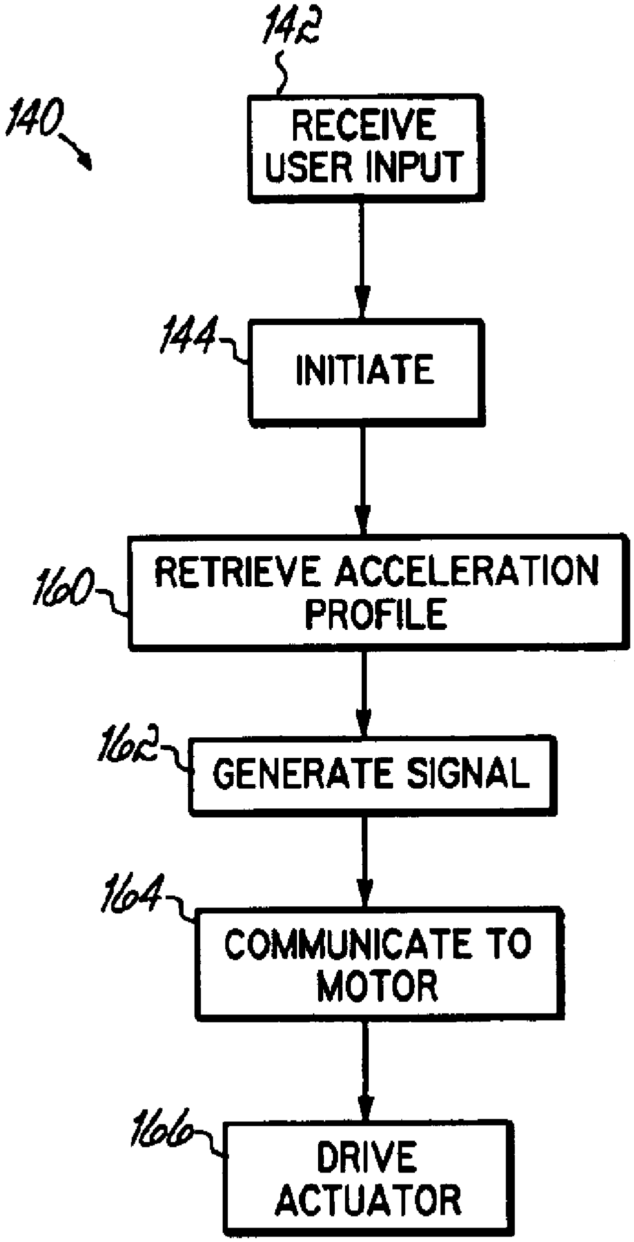
FIG. 5 is a flowchart having a sequence of steps suited for execution by the system of FIG. 1 for automatically positioning a chair at a desired speed using a lookup table.

FIG. 5 shows a sequence of process steps in accordance with the principles of the present invention. That is, the flowchart 140 of FIG. 5 includes method steps suited for automatically and gradually accelerating a support surface 14. In one respect, the processes of FIG. 5 achieve the gradual acceleration by recalling a stored acceleration profile. Program code 68 initiates generation of a voltage supply signal comprising the acceleration profile to achieve gradual acceleration of the chair motor 24.

Turning more particularly to the flowchart 140 of FIG. 5, a user may initiate program code 68 and memory processes of the chair system 10 at block 142 of FIG. 5. User input received at block 142 initiates the recall of an acceleration profile from memory 62 at block 160 of FIG. 5.

The controller 36 processes the acceleration profile to generate a voltage supply signal at block 162 that includes gradually increasing or decreasing voltage levels. The voltage supply signal arrives at the motor 24 at block 164 and is used to drive the actuator 26 at block 166. As such, the embodiment of FIG. 5 programmatically and gradually accelerates a support surface 14 positioned by the actuator 26 in a manner that is largely imperceptible to the patient.

While the present invention has been illustrated by the description of embodiments thereof, and while the embodiments have been described in considerable detail, it is not intended to restrict or in any way limit the scope of the appended claims to such detail. For example, when the term "chair" is used above, it is intended to include the terms "table" and "bed." Similarly, the terms "acceleration" and "ramp" for purposes of this specification are used to describe both negative and positive acceleration. Thus, any particular use of terms "increase," "reduce," "deceleration," or "decay" in the context of acceleration is merely for explanatory purposes and should not be misinterpreted to limit the scope of the claims. Moreover, one of skill in the art will appreciate that such acceleration may coincide with any portion of a chair movement, to include its initial and final movement of a positioning sequence. Additional advantages and modifications will be readily apparent to those skilled in the art.

For instance, embodiments that are consistent with the principles of the present invention may adjust the voltage supply signal according to both line voltage and determined load. As such, the control signal comprising the determined voltage as discussed above may account for load considerations. The control signal of the same or another embodiment that is consistent with the principles of the present invention may comprise input from position sensors 50. That is, the position sensors 50 may be used determine the speed at which the support surface 14 moves. As discussed herein, the detected speed is proportional to rpm's generated by the motor 24. These rpm's, in turn, are proportional to the voltage used to generate speed. In any case, the detected speed or determined voltage value may be fed back to the controller 36 via the control signal. The controller 36 may then compare the speed conveyed in the control signal to a reference value. If the controller 36 determines that there is a disparity between the control signal and the reference value, the controller 36 may increase or decrease the voltage delivered to the motor according to the determined disparity.

The invention in its broader aspects is therefore not limited to the specific details, representative apparatus and method, and illustrated examples shown and described. For instance, any of the exemplary steps of the above flowcharts may be augmented, made simultaneous, replaced, omitted and/or rearranged while still being in accordance with the underlying principles of the present invention. Accordingly, departures may be made from such details without departing from the scope or spirit of Applicant's general inventive concept.

What is claimed is:

1. A method of moving a moveable support surface of a patient support apparatus, comprising:

receiving input for initiating movement of the moveable support surface; and in response to the input, automatically supplying a voltage supply signal to an electric motor, wherein the voltage supply signal is determined by sequencing through a plurality of reference voltages such that the voltage supply signal is configured to cause the electric motor to gradually accelerate the moveable support surface.

2. The method of claim 1, further comprising gradually accelerating the moveable support surface according to the voltage supply signal.

3. The method of claim 1, wherein automatically supplying the voltage supply signal further includes recalling a reference voltage of the plurality of reference voltages from a memory.

4. The method of claim 1, further comprising driving the electric motor at a desired speed according to the voltage supply signal.

5. The method of claim 1, wherein automatically supplying the voltage supply signal further includes determining the voltage supply signal.

6. The method of claim 5, wherein determining the voltage supply signal further includes determining a motor voltage indicative of a voltage supplied to the electric motor.

7. The method of claim 5, wherein determining the voltage supply signal further includes receiving a measurement determined by at least one of a voltage sensor and a current sensor.

8. The method of claim 1, wherein automatically supplying the voltage supply signal further includes comparing a determined voltage to a reference voltage of the plurality of reference voltages.

9. The method of claim 1, wherein automatically supplying the voltage supply signal further includes modifying a duty cycle of the motor according to a control signal.

10. The method of claim 1, wherein automatically supplying the voltage supply signal further includes retrieving an acceleration profile comprising the plurality of reference voltages from a memory.

11. The method of claim 1, wherein automatically supplying the voltage supply signal further includes increasing a duty cycle if a determined voltage is different than a reference voltage of the plurality of reference voltages.

12. The method of claim 1, wherein automatically supplying the voltage supply signal further includes decreasing a duty cycle if a determined voltage is different than a reference voltage of the plurality of reference voltages.

13. The method of claim 1, wherein automatically supplying the voltage supply signal further includes generating a control signal.

14. The method of claim 1, wherein automatically supplying the voltage supply signal further includes processing a control signal indicative of at least one of: directional data indicative of a desired direction of movement of the support surface, a speed measurement, a voltage level, a load and a patient weight.

15. The method of claim 1, wherein automatically supplying the voltage supply signal further includes adjusting a speed of the electric motor according to the sequence of the plurality of reference voltages comprising an acceleration profile.

16. A patient support apparatus, comprising:

a moveable support surface;

an electric motor for positioning the moveable support surface in response to a voltage supply signal; and a controller for automatically generating the voltage supply signal in response to an input signal by sequencing through a plurality of reference voltages such that the voltage supply signal causes the motor to gradually accelerate the moveable support surface.

17. The apparatus of claim 16, wherein the controller initiates recalling from a memory accessible to the controller a reference voltage of the plurality of reference voltages.

18. The apparatus of claim 16, wherein the controller initiates driving the electric motor at a desired speed according to the voltage supply signal.

19. The apparatus of claim 16, wherein the controller initiates determining the voltage supply signal.

20. The apparatus of claim 16, wherein the controller initiates determining a motor voltage indicative of a voltage supplied to the electric motor.

21. The apparatus of claim 16, wherein the controller initiates comparing a determined voltage to a reference voltage of the plurality of reference voltages.

22. The apparatus of claim 16, wherein the controller initiates modifying a duty cycle of the motor according to a control signal.

23. The apparatus of claim 16, wherein the controller initiates retrieving an acceleration profile comprising the plurality of reference voltages from a memory.

24. The apparatus of claim 16, wherein the controller initiates increasing a duty cycle if a determined voltage is different than a reference voltage of the plurality of reference voltages.

25. The apparatus of claim 16, wherein the controller initiates decreasing a duty cycle if a determined voltage is different than a reference voltage of the plurality of reference voltages.

26. The apparatus of claim 16, wherein the controller initiates generating a control signal.

27. The apparatus of claim 16, wherein the controller initiates processing a control signal indicative of at least one of: directional data indicative of a desired direction of movement of the support surface, a speed measurement, a voltage level, a load and a patient weight.

28. The apparatus of claim 16, wherein the controller automatically generates the voltage supply signal according to the plurality of reference voltages.

29. A program product comprising:

a program resident on a patient support apparatus, the patient support apparatus comprising a controller, a moveable support surface and an electric motor for driving the moveable support surface according to a voltage supply signal, wherein the program is executed by the controller to generate the voltage supply signal by sequencing through a plurality of reference voltages such that the motor gradually accelerates the moveable support surface in response input received at the controller; and a signal bearing medium bearing the program.

30. The program product of claim 29, wherein the signal bearing medium includes at least one of a recordable medium and a transmission-type medium.

* * * * *

UNITED STATES PATENT AND TRADEMARK OFFICE

CERTIFICATE OF CORRECTION

PATENT NO. : 6,915,538 B2
DATED : July 12, 2005
INVENTOR(S) : Thomas L. Treon

It is certified that error appears in the above-identified patent and that said Letters Patent is hereby corrected as shown below:

Column 1,
Line 47, please delete the word "in" after the word "movement" and insert the word -- is -- therefor.

Column 2,
Line 2, please delete the word "then" and insert the word -- the -- therefor.
Line 25, please delete the word "them" and insert the word -- then -- therefor.
Line 39, between the words "Another" and "of," please insert the word -- controller --.

Column 8,
Line 13, between the words "used" and "determine," please insert the word -- to --.

Column 10,
Line 40, between the words "response" and "input," please insert the word -- to --.

Signed and Sealed this

First Day of November, 2005

JON W. DUDAS
*Director of the United States Patent and Trademark Office*

US006915538C1

(12) EX PARTE REEXAMINATION CERTIFICATE (7030th)

United States Patent

Treon

(10) Number: US 6,915,538 C1

(45) Certificate Issued: Aug. 25, 2009

(54) SMOOTH START SYSTEM FOR POWER CHAIR

(75) Inventor: Thomas L. Treon, Versailles, OH (US)

(73) Assignee: Midmark Corporation, Versailles, OH (US)

Reexamination Request:
No. 90/010,015, Aug. 29, 2007

Reexamination Certificate for:

| | |
|---|---|
| Patent No.: | **6,915,538** |
| Issued: | **Jul. 12, 2005** |
| Appl. No.: | **10/684,044** |
| Filed: | **Oct. 10, 2003** |

Certificate of Correction issued Nov. 1, 2005.

(51) Int. Cl.

| | |
|---|---|
| ***G05B 11/01*** | (2006.01) |
| ***A61G 5/04*** | (2006.01) |
| ***A47C 1/14*** | (2006.01) |

(52) U.S. Cl. ............................ 5/611; 318/260; 318/271; 318/500

(58) Field of Classification Search .................. 318/488
See application file for complete search history.

(56) References Cited

U.S. PATENT DOCUMENTS

| | | | | |
|---|---|---|---|---|
| 4,066,941 | A | | 1/1978 | Foster |
| 4,619,006 | A | | 10/1986 | Magnoni et al. |
| 5,648,708 | A | * | 7/1997 | Littlejohn .................. 318/488 |
| 6,243,532 | B1 | | 6/2001 | Wacker et al. |
| 2002/0135333 | A1 | | 9/2002 | Heydt et al. |

* cited by examiner

*Primary Examiner*—Jeffrey R Jastrzab

(57) ABSTRACT

An apparatus, method and program product gradually and automatically accelerates or decelerates chair motor speed to achieve a smooth, nearly imperceptable movement of the chair. To this end, voltage is apportioned to the motor according to an acceleration profile.

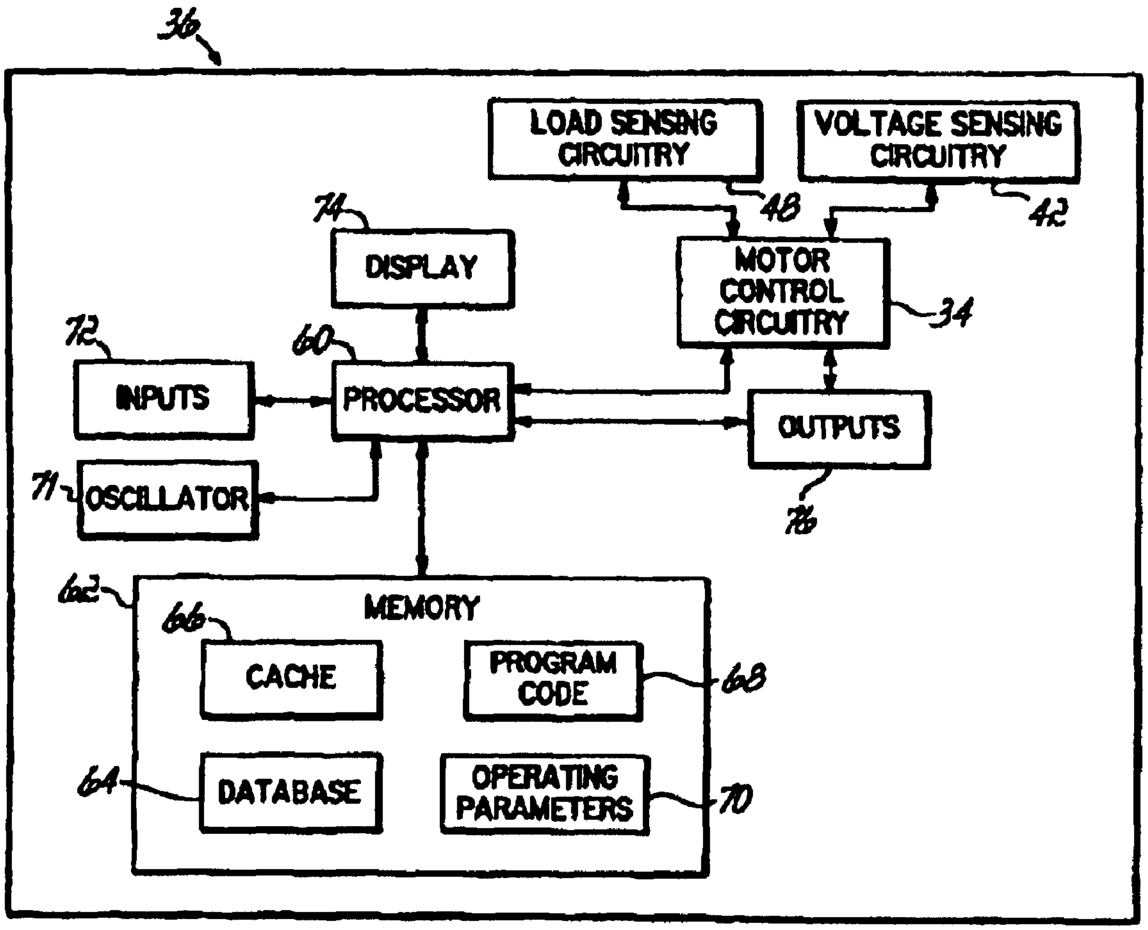

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 14 and 27 are cancelled.

Claims 1, 16 and 29 are determined to be patentable as amended.

Claims 2–13, 15, 17–26, 28 and 30, dependent on an amended claim, are determined to be patentable.

1. A method of moving a moveable support surface of a patient support apparatus, comprising:

receiving input for initiating movement of the moveable support surface; and in response to the input, automatically supplying a voltage supply signal to an electric motor, wherein the voltage supply signal is determined by sequencing through a plurality of reference voltages such that the voltage supply signal is configured to cause the electric motor to gradually accelerate the moveable support surface*, wherein automatically supplying the voltage supply signal further includes processing a control signal indicative of a load and a patient weight and at least one of:*

*directional data indicative of a desired direction of movement of the support surface, a speed measurement, and a voltage level.*

16. A patient support apparatus, comprising:

a moveable support surface;

an electric motor for positioning the moveable support surface in response to a voltage supply signal; and a controller for automatically generating the voltage supply signal in response to an input signal by sequencing through a plurality of reference voltages such that the voltage supply signal causes the motor to gradually accelerate the moveable support surface*, wherein the controller initiates processing a control signal indicative of a load and a patient weight and at least one of:*

*directional data indicative of a desired direction of movement of the support surface, a speed measurement, and a voltage level.*

29. A program product comprising:

a program resident on a patient support apparatus, the patient support apparatus comprising a controller, a moveable support surface and an electric motor for driving the moveable support surface according to a voltage supply signal, wherein the program is executed by the controller to generate the voltage supply signal by sequencing through a plurality of reference voltages such that the motor gradually accelerates the moveable support surface in response to input received at the controller*, wherein the controller initiates processing a control signal indicative of a load and a patient weight and at least one of:*

*directional data indicative of a desired direction of movement of the support surface, a speed measurement, and a voltage level*; and a signal bearing medium bearing the program.

* * * * *